United States Patent Office 3,839,473
Patented Oct. 1, 1974

3,839,473
PROCESS FOR MAKING SUBSTANTIALLY ALKANDIOL-FREE ALKANOLS
Billy J. Williams, Donald R. Napier, and Peter A. Schwab, Ponca City, Okla., assignors to Continental Oil Company, Ponca City, Okla.
No Drawing. Original application Apr. 24, 1967, Ser. No. 632,949, now Patent No. 3,542,652. Divided and this application June 30, 1970, Ser. No. 60,187
Int. Cl. C07c 29/24
U.S. Cl. 260—643 F                                          1 Claim

ABSTRACT OF THE DISCLOSURE

Alkanols substantially free of alkandiols are prepared by reacting metal alkoxides, or compounds capable of forming a metal alkoxide in the presence of an alkanol, with an alkandiol or mixture thereof. The reaction product is fractionated to yield a distillate relatively free of alkandiols.

---

This is a division of application Ser. No. 632,949 filed Apr. 24, 1967 and now U.S. Pat. 3,542,652.

BACKGROUND OF THE INVENTION

This invention relates to the production of alkanols free of alkandiols. More particularly it relates to producing alkanols substantially free of alkandiols when said alkanols are obtained by hydrolyzing or alcoholizing oxidized aluminum trialkyls.

DESCRIPTION OF THE PRIOR ART

Monohydric alcohols (alkanols) can now be prepared commercially by hydrolyzing the reaction product of oxygen and aluminum alkyls. A commercial process is described in Encyclopedia of Chemical Technology, Kirk-Othmer, Editors, vol. I, 2nd ed. (1963), for the production of monohydric alcohols. The monohydric alcohols thus produced include by-products such as esters, ethers, acids, aldehydes, etc.

Pure primary alcohols produce alcohol sulfates having a bland, innocuous odor, desired by the sulfate producers; but alcohol sulfates, both alkyl hydrogen sulfates and alkali metal sulfates, derived from alcohols produced by hydrolyzing aluminum trialkyl oxidation products have a typical odor of varying degrees and intensity of unpleasantness. Recent work has established that much of the odor of aluminum alkyl derivative alcohols is caused by the presence in the alcohol mixture of alkandiols, as an impurity; these diols are converted by the sulfation operation to compounds having an intensely disagreeable odor; even minute amounts (less than 0.09 weight percent) of these diols result in highly odorous sulfate products. For example, hexandiol is associated with 1-decanol; octandiol (ca. 250° C.B.P.) is associated with 1-dodecanol (256° C.B.P.); decandiol is associated with 1-tetradecanol. The diol impurity-type and amount is somewhat dependent on the distillation sharpness used in cutting up the broad range of alcohols produced via the hydrolysis-oxidation of aluminum trialkyl growth product, i.e., the product of the addition of ethylene to a lower molecular weight aluminum trialkyl.

Primary alcohols of selected carbon atom number are commonly used in making viscosity index (VI) improvers. These latter compounds are materials which, when added to petroleum oils, prevent a large change in viscosity of the oil over a wide temperature range. A process for making a VI improver consists of transesterifying methyl methacrylate with a mixture of suitable alcohols to form a methacrylate ester mixture. The mixture is then copolymerized by heat and catalyst to give the VI improver which is marketed as a viscous oil containing about 40 percent polymer. This viscous solution is then added to motor oils to provide the desired viscosity index.

If some of the alcohol used in the transesterification step contains a small amount of alkandiols, the latter forms dimethacrylate esters. In the subsequent polymerization step, these dimethacrylate esters give rise to cross linked polymers which form insoluble gel particles and render any oil solution containing them useless as a viscosity index improver. This problem can be avoided by using an alcohol containing a maximum of 0.1 weight percent of the alkandiol impurity.

OBJECTS OF THE INVENTION

One object of the invention is to produce an alkanol (alcohol) substantially free of alkandiols. Another object is the separation of alkandiols from alkanols when the former are present in minute "impurity" amounts. Still another object is the removal of odor precursors from alcohols made from aluminum alkyl-oxygen reaction products, to improve the odor quality of sulfates made therefrom. Still another object of the invention is to prepare alkanols suitable for conversion into viscosity index improver compounds. Other objects will become apparent in the course of the detailed description of the invention.

SUMMARY

Briefly stated, this invention comprises a process for preparing alkanols substantially free of alkandiols by reacting an alkanol, or a mixture of alkanols, with a metal alkoxide reagent which is defined here as either (1) a metal alkoxide, or (2) a compound capable of forming a metal alkoxide in the presence of an alkanol. Following this step, the reaction mixture is separated into a fraction containing alkanols substantially free of alkandiols and a residue, the latter including a reaction product of alkandiols and the aforesaid metal alkoxide reagent. The alkandiols are present in the reaction mixture as a result of being an impurity in the metal alkoxide reagent (in precursor form), or the alcohol, or as an impurity in both.

DESCRIPTION OF THE PREFERRED EMBODIMENTS

The process of this invention is conducted in two variations.

(1) If it is desired to purify an alkanol containing undesired alkandiols, the impure alkanol is mixed with a metal alkoxide reagent free of diols and the mixture is fractionated to yield an alkanol distillate substantially free of alkandiols and a bottoms product. The bottoms product will contain the diol impurities combined with the metal alkoxide reagent. Ordinarily the diol present in the original impure alkanol will constitute a small percentage, for example, 1.5 to 0.5 weight percent of the impure alkanol. Accordingly, the amount of metal alkoxide reagent required will correspond to a small percentage of the impure alkanol mixture.

(2) An alkanol substantially free of diol impurities can be prepared directly from a metal alkoxide reagent which contains diol precursors (for example, oxidized growth product discussed more fully below). The alkanol is prepared by transalcoholysis of the metal alkoxide reagent with another alkanol which itself may contain diol impurities. The metal alkoxide reagent and the alcohol are mixed so that transalcoholysis occurs, and the mixture is then fractionated. The overhead product is the alkanol, substantially free of diols, and the bottoms product includes the reaction compound of diols and metal alkoxide reagent, and alkanols. This method permits the direct preparation of a substantially diol-free alkanol from a metal alkoxide reagent containing diol precursors and/or an alkanol containing diols. The bottoms product can be hydrolyzed and the alkanol therein utilized for applications where diol content is not a problem. In this variation, the amount of metal alkoxide reagent employed will be approximately equal to the amount of alkanol reacted on a basis of chemical equivalents.

In this second variation, the step of mixing a metal alkoxide reagent with an alkanol, either or both containing diol impurities and precursors, can be replaced by a step of partially hydrolyzing with water a metal alkoxide containing diol precursors. The result will be a mixture of alkanols and metal alkoxides which can then be fractionated into an overhead alkanol product substantially free of diols and a bottoms product containing the reaction compound of diols and metal alkoxide, unreacted metal alkoxide, and less volatile alkanols. This bottoms product can be hydrolyzed and the alkanol therein utilized for applications where diol content is not a problem. In this modification, the initial water-hydrolysis can be carried to a point where the amount of alkanol present in the partially hydrolyzed mixture is approximately equal to the amount of metal alkoxide remaining unreacted on a basis of chemical equivalents. Water-hydrolysis can, however, be carried to any point where there will remain sufficient unreacted metal alkoxide to retain the diols present in the bottoms product when alkanols are subsequently removed overhead.

The first of these processes is in a sense a purification process wherein an alkanol is treated to remove diols. The second process is a preparation process wherein an alkanol can be prepared by transalcoholysis betwen another alkanol and a metal alkoxide reagent. In each case, the overhead product is the alkanol, substantially free of alkandiol, and the residue includes the reaction product of metal alkoxide reagent, alkandiol, and less volatile alkanols. The alkandiols are bound to the metal alkoxide reagent and thus, being less volatile, are retained in the bottoms.

The alkanols which are utilized in the process of our invention have at least 5 carbon atoms and may be a single alcohol, a number of isomers, or a mixture of alcohols having different carbon atom number. They may be described as compounds having only carbon and hydrogen atoms in addition to one hydroxy substituent. Typically the alkanols having 6–30 carbon atoms form a preferred charge to the process.

The process of the invention is especially beneficial to the odor of sulfated alkanols and to the properties of viscosity index improvers derived from alkanols made by hydrolyzing or transalcoholizing the reaction product of oxygen and aluminum trialkyl. More commonly these are even carbon number, straight chain, saturated primary monohydric alkanols having at least 6 carbon atoms. While these alkanols are readily available having up to about 30 carbon atoms per molecule and more, those used for producing alkanol sulfates and viscosity index improvers usually have below about 22 carbon atoms per molecule. Although products are available which include essentially an alkanol of a single carbon-atom number, e.g., 1-hexanol, 1-octanol, 1-tetradecanol, it is customary to use mixtures of two or more alkanols. A common mixture includes alkanols having 6, 8, and 10 carbon atoms; another mixture includes 12 and 14 carbon atom alkanols; another mixture includes 16 and 18 carbon atom alkanols. In the case of these mixtures, usually some small amount of lower and higher carbon atom number alkanols are present; thus the 6–10 alkanol may include some 4 and/or 12 carbon atom number alkanol; the 12–14 alkanol may include some 1 and/or 16 carbon atom alkanol; the 16–18 alkanol may include some 14 and/or 20 and 22 carbon atom alkanols.

The alkandiol, hereinafter sometimes referred to as diol, includes a single diol, a number of isomers, or a mixture of diols of different carbon atom number. The diol may be described as a compound having only carbon and hydrogen atoms in addition to two hydroxy substituents. The hydroxy groups may be terminal or positioned elsewhere in the chain. The alkandiols occurring as impurities in the alcohol or metal alkoxide reagent preferably are those having 2–14 carbon atoms per molecule.

The metal alkoxide reagents used in our process are metal alkoxide compounds and compounds capable of forming a metal alkoxide in the presence of an alkanol.

The metal alkoxides used are of the general formula $M(OR_1)_x(R_2)_y$, or more usually $M(OR_1)_x(OR_2)_y$, where M is aluminum, titanium, or boron, O is oxygen, $R_1$ and $R_2$ are hydrocarbon alkyl radicals which may be alike or different, and have 2 to 30 carbon atoms per alkyl radical, and $x+y=3$ when M is aluminum or boron and 4 when M is titanium.

A preferred metal alkoxide compound is "stripped oxidized growth product," which is a mixture of aluminum trialkoxides obtained by oxidizing "growth product." The latter is obtained by reacting low molecular weight aluminum alkyls, such as trialkylaluminum, with alpha olefins of low molecular weight, such as ethylene, to obtain a higher molecular weight aluminum trialkyl compound. This latter compound is subsequently oxidized to the trialkoxide. The preparation of oxidized growth product is further disclosed in U.S. Pats. 2,892,858 and 3,097,226. The aluminum trialkoxide product is stripped as disclosed, for example, in the U.S. Pat. 3,104,251 to remove a solvent carrier in which the oxidation reaction is usually conducted. The stripped oxidized growth product thus obtained usually will contain a mixture of aluminum trialkoxides in which the carbon atoms per alkyl radical range from about 4 to about 24. The percentage distribution of alkyl compounds in a typical stripped oxidized growth product composition is presented in Table I.

TABLE I

Percentage distribution of alkyl compounds in typical "oxidized growth product" composition

| Number carbon atoms per alkyl radical | Mole percent |
|---|---|
| 4 | 0.5 |
| 6 | 7.9 |
| 8 | 17.7 |
| 10 | 20.5 |
| 12 | 22.5 |
| 14 | 14.6 |
| 16 | 8.9 |
| 18 | 4.8 |
| 20 | 1.8 |
| 22 | 0.6 |
| 24 | 0.2 |
| | 100.0 |

Titanium alkoxides can also be used. The number of carbon atoms per alkyl radical in the titanium compounds will range from 1 to 30. Boron alkoxides, for example, triethyl borate, are also useful.

Other metal alkoxide reagents which can be used in our process are those capable of forming a metal alkoxide in the presence of an alkanol and include aluminum, ferric, zirconium, antimony penta-, calcium, cobaltous, silicon, and stannic chloride; the metals sodium, lithium, potassium, aluminum, magnesium, and calcium; sodium sulfate, magnesium sulfate and magnesium acetate, calcium hydride, sodium methoxide, boron trifluoride etherate, triethoxy phosphite, potassium tertiary butoxide, and molybdenum dioxydiacetylacetonate. Of these, aluminum chloride is preferred.

In reacting the metal alkoxide reagent with an alkanol, it is desirable to have present in the resulting mixture from 0.1 to 3.0 chemical equivalents of metal alkoxide reagent per one chemical equivalent of alkandiol present. A chemical equivalent of metal alkoxide reagent is that fraction of a mole which yields one alkoxy radical upon hydrolysis or alcoholysis. A chemical equivalent of alkandiol is one mole of alkandiol.

More specifically, if primary alkanols of 12 to 18 carbon atoms per molecule and containing about 1 percent of diols are reacted with aluminum alkoxide or aluminum chloride, the diol content in the distilled alkanol product is reduced to as low as 0.03 percent by weight if sufficient aluminum alkoxide or aluminum chloride is used.

In applying our method to the removal of alkandiols from impure alkanols, the impure alkanol mixture can either first be fractionated into a series of mixture "cuts" and the cuts treated individually, or the original impure alkanol mixture can be reacted in whole with metal alkoxide reagent and then fractionated into a series of cuts. It will usually be most practical to discard the bottoms cut if the first procedure is applied. If the second procedure is followed, an excess of treating agent can be used particularly well. The bottoms product from the fractionation can then be hydrolyzed to yield a crude mixture of alkandiols and alkanols which, although impure, can be used in applications where alkandiol content is not critical.

As noted previously, this second procedure can be modified by substituting for the step of mixing the original impure alkanol with metal alkoxide reagent, the step of partially hydrolyzing with water an impure metal alkoxide to provide a mixture of alkanols and metal alkoxides containing diols and diol precursors.

The preparation of alkanols substantially free of alkandiols is conducted in either a batch or continuous process, the latter having obvious advantages for industrial use. In a continuous process the alkanols and the metal alkoxide, or compound capable of forming a metal alkoxide in the presence of an alkanol, are introduced into and mixed in a reaction zone where the reaction progresses. The reaction mixture is then withdrawn to a separation zone where the substantially alkandiol-free alkanols are separated from a residue containing alkanols, the reaction product containing alkandiols, and unreacted metal alkoxide reagent. A preferred form of separation is by distillation wherein the substantially alkandiol-free alkanols are removed as a distilled product, leaving the aforedescribed residue. The distillation tower can also serve as the reaction zone. The substantially alkandiol-free alkanols distilled are the desired product and are removed for additional treatment such as further fractionation and/or conversion of these fractions to alkanol sulfates and viscosity index improvers. The residue is either discarded or hydrolyzed by treatment to yield a mixture containing alkanols, alkandiols, and other compounds. As noted previously, this residue can be used in applications where alkandiol content is not critical.

The following examples illustrate the invention but are not to be considered as a limitation thereof.

EXAMPLE 1

Over a period of 6.3 hours, liquid streams of hexadecanol (free of alkandiols) and stripped oxidized growth product were mixed and fed uniformly to a thin-film still in an alkoxide-to-hexadecanol mole ratio of 0.7. The stripped oxidized growth product had a composition similar to that of Table I and contained an objectionable quantity of alkandiol precursors. The still was operated with a skin temperature of 235 to 258° F. and under a pressure of 10.7 to 7.5 millimeters mercury pressure. In total, 758 grams of hexadecanol and 911 grams of growth product were reacted. About 1202 grams of residue product remained in the still, and 428 grams of distillate were collected. A quantity of 45 grams of relatively low boiling material was lost to a safety cold trap on the pump providing the lowered pressure to the still. The residue was hydrolyzed with aqueous sulfuric acid, yielding a mixture containing alkanols and alkandiols. Both the hydrolyzed residue and the distillate were then further fractionated into several alkanol cuts. The fractions obtained from the original overhead distillate were blended to provide a commercial alkanol mix containing from 12 to 16 carbon atoms per molecule of alkanol. The fractions obtained from the hydrolyzed residue were also blended to provide a commercial alkanol mix of the same composition. Each of these samples were then hydrogenated over nickel catalyst (a conventional "finishing" step) and converted to the sodium alkyl sulfonate, these latter steps being performed according to standardized procedures. The results of a panel evaluation of the odor level of the sulfates and the diol content of each of the alkanol blends obtained is as follows. Basis for the odor scale is a rating of 5 for foul to 0 for pure.

|  | Bottoms product | Overhead product |
|---|---|---|
| Initial sulfate odor | 2.3 | 0.9 |
| Odor after airing | 0.8 | 0.3 |
| $C_8$ diol/$C_{12}$ alcohol (wt.-ratio) | 0.014 | 0.003 |

This test demonstrates that an aluminum alkoxide containing alkandiols can be transalcoholized with an alkanol, and the resulting distillate obtained will have a lower average molecular weight alcohol than the beginning alcohol and the distilled alcohol will be relatively free of alkandiols.

EXAMPLE 2

In three tests similar to the preceding test, decanol was treated with oxidized growth product of the same composition and diol precursor impurity content as Example 1 with the following results:

| Weight, aluminum alkoxide added, grams | Weight, decanol, grams | Weight percent alkandiol in— | |
|---|---|---|---|
|  |  | Overhead | Bottoms |
| 91 | 31 | 0.01 | 0.8 |
| 92 | 61 | 0.01 | 0.6 |
| 91 | 92 | 0.01 | 0.8 |

EXAMPLE 3

In other tests, mixtures of alkanols of molecular weights of approximately 12, 14, 16, and 18 carbon atoms per molecule were treated. The alkanols had been made by hydrolyzing aluminum alkoxides (oxidized growth product), fractionating the resulting mixture, and hydrogenating the overhead alcohol product. The alkanol mixtures containing 1 gram of alkandiol impurity per 100 grams of the alkanol mixture were reacted with stripped oxidized growth product or aluminum isopropoxide. The reaction product was then fractionated into a preliminary overhead cut of alkanols of 12 carbon atoms and less and a cut containing alkanols of 12–16 carbon atoms per molecule, leaving a residue containing alkanols of 16–18 carbon atoms. The overhead product cut of 12–16 carbon atom alkanols was analyzed by thin-layer chromatography to determine the alkandiol content.

| Metal alkoxide reagent | | |
|---|---|---|
| Type | Weight percent in reaction mixture | Percent alkandiol in $C_{12}$-$C_{16}$ alkanol cut |
| Aluminum triisopropoxide | 2.0 | 0.16 |
| SOGP [a] | 4.8 | 0.08 |
| Aluminum triisopropoxide | 4.8 | 0.05 |
| SOGP [a] | 6.5 | 0.04 |
| SOGP [a] | 9.1 | 0.04 |
| SOGP [a] | 20.0 | 0.04 |

[a] Stripped oxidized growth product.

EXAMPLE 4

In another test, samples of crude mixtures of alkanols containing 12 carbon atoms per molecule and higher were reacted with stripped oxidized growth product. The crude alkanol stream had a diol content of 1.4 weight percent and corresponds to a process stream in the manufacture of alkanols from aluminum alkoxides just after hydrolysis and before further distillation into sharp cuts. The stream contained in addition paraffins, olefins, ethers, carbonyl compounds, and branched and secondary alkanols. Each sample, after reaction with stripped oxidized growth product, was fractionated at the temperature shown below. Treatment with 5 percent aluminum trialkoxide reduced the diol content to 0.9 percent, and treatment with 10 percent aluminum trialkoxide reduced the diol content to 0.4 percent. The distillation temperature was increased as shown below with the resulting reduction in diol content of the distillate shown. It is believed that the paraffins, olefins, ethers, carbonyl compounds, and branched and secondary alkanols present reduced the effectiveness of the aluminum trialkoxide, but that at the higher temperatures these compounds became less active and permitted the aluminum trialkoxide (stripped oxidized growth product) to be more effective.

| Weight percent SOGP in reaction mixture with crude alkanols | Distillation temp. (° C.) | Percent diol in distillate [a] |
|---|---|---|
| 0 | 120–140 | 1.4 |
| 4.8 | 120–140 | 0.9 |
| 5.0 | 120–140 | 0.8 |
| 7.0 | 120–140 | 0.8 |
| 2.0 | 270–275 | 0.7 |
| 5.0 | 280–290 | 0.6 |
| 9.1 | 120–140 | 0.4 |
| 10.0 | 205–210 | 0.2 |
| 10.0 | 215–220 | 0.2 |
| 9.1 | 120–140 | 0.15 |
| 13.0 | 120–140 | 0.15 |
| 10.0 | 225–230 | 0.1 |
| 16.7 | 120–140 | 0.09 |
| 10.0 | 260–270 | 0.03 |
| 10.0 | 270–285 | 0.02 |
| 10.0 | 280–300 | 0.02 |

[a] Analyzed by thin-layer chromatography.

EXAMPLE 5

In another test, impure alkanol mixtures of 12–18 molecular weight containing 1 percent dialkanol impurity were reacted with tetraisopropyl titanate and fractionated by distillation. The results obtained are listed in the following table:

| Carbon atom range of alkanol cut | Weight percent TIPT in reaction mixture | Percent diol in distillate [a] |
|---|---|---|
| 16–18 | 4.8 | 0.10 |
| 12–16 | 4.8 | 0.09 |

[a] Analyzed by thin-layer chromatography.

EXAMPLE 6

In additional tests, compounds which are capable of forming a metal alkoxide in the presence of an alkanol were used to treat mixtures of alkandiol-containing alcohols ranging from 12 to 16 carbon atoms per molecule. For each compound shown below, 6.5 weight percent of the metal alkoxide reagent was used. Each reagent was tested separately. The weight percent of alkandiol in the original alcohol mixture was 1 percent. The percent of alkandiol in the distillate was determined by thin-layer chromatography.

| Metal alkoxide reagent: | Percent diol in distillate |
|---|---|
| Molybdenum dioxydiacetylacetonate, sodium methoxide, ferric chloride | 0.1 |
| Sodium, zirconium tetrachloride, boron trifluoride etherate | 0.2 |
| Antimony pentachloride, triethoxy phosphite | 0.3 |
| Calcium chloride, cobaltous chloride, potassium tertiary butoxide | 0.4 |
| Lithium, silicon tetrafluoride | 0.5 |
| Magnesium sulfate, sodium sulfate | 0.6 |
| Magnesium acetate | 0.7 |
| Calcium hydride | 0.8 |
| Stannic chloride | 0.03 |
| Titanium tetrachloride | 0.06 |

EXAMPLE 7

An example of the method of partially hydrolyzing with water a metal alkoxide containing diol precursors is as follows: To 2,249 grams of stripped oxidized growth product of the composition shown in Table I and containing an objectionable quantity of diol precursors, 36 grams of water are added and the mixture stirred at room temperature. This represents a mol ratio of oxidized growth product to water of 2:1 and is calculated so that 50 percent of the oxidized growth product will react with the added water. The mixture is then distilled into an overhead product of 646 grams of alkanols and a residue of about 1600 grams. Analysis of the alkanols distilled overhead shows their diol content to be well below 0.1 weight percent, the content permissible for manufacturing acceptable sulfated alkanols and viscosity index improvers. The residue is hydrolyzed and the alkanols therein recovered. Analysis of these alkanols shows their diol content to be well above that acceptable for the manufacture of acceptable sulfated alkanols. A sample of the original oxidized growth product is completely hydrolyzed and the alkanols therein recovered. Analysis of these alkanols shows their diol content to be too high for making acceptable sulfated alcohols.

Reasonable variation and modification are possible within the scope of the foregoing disclosure and the appended claim to the invention, the essence of which is a method of separating alkandiols from alkanols or preparing alkanols substantially free of alkandiols by reacting an alkanol with a metal alkoxide or compound capable of forming a metal alkoxide in the presence of an alkanol, and separating the resulting reaction product into alkanols substantially free of diols and a residue product.

What is claimed is:

1. A process for preparing alkanols substantially free of alkandiols which consists of:
   (a) contacting a mixture of alkandiol-contaminated alkanols, said alkanols containing 6 to 30 carbon atoms, with a titanium alkoxide having the formula $$Ti(OR_1)_x(OR_2)_y$$

wherein $R_1$ and $R_2$ are hydrocarbon alkyl radicals, alike and unlike, having from 1 to 30 carbon atoms each, $x$ is between 0 and 4, and $x+y=4$, and
   (b) fractionating the reaction mixture of step (a) into at least one substantially alkandiol-free alkanol distillate product and a residue product.

References Cited
UNITED STATES PATENTS

| 3,373,211 | 3/1968 | Watts et al. | 260—643 F |
| 2,867,651 | 1/1959 | Wise | 260—643 F |
| 2,957,023 | 10/1960 | Dimler et al. | 260—643 F |
| 2,282,457 | 5/1942 | Cohen | 260—643 F |
| 1,979,303 | 11/1934 | Woodhowe | 260—643 F |
| 3,461,176 | 8/1969 | Lundeen et al. | 260—643 F |
| 3,290,396 | 12/1966 | Starks et al. | 260—643 F |

JOSEPH E. EVANS, Primary Examiner

U.S. Cl. X.R.

Adequately crossed in parent, U.S. Pat. 3,542,652